March 23, 1926.
O. E. SWANSON
MOLD FOR CURING TIRE CASINGS
Filed March 27, 1922
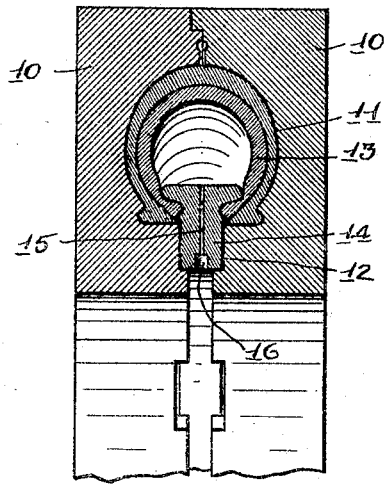
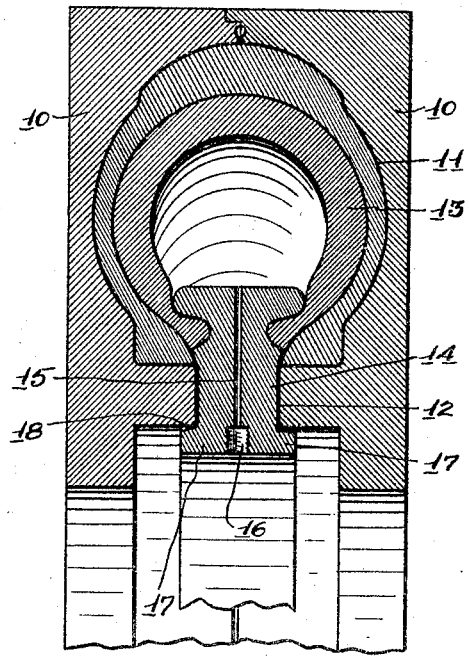
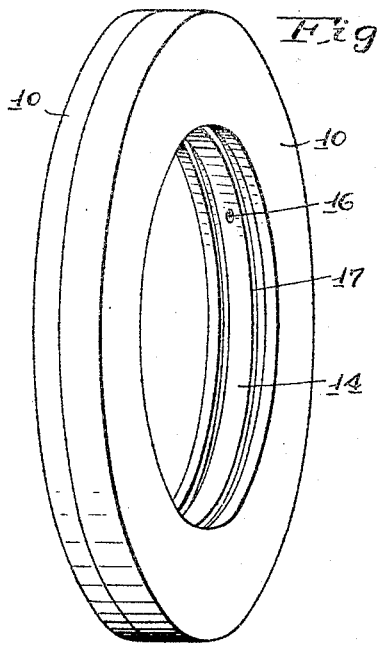
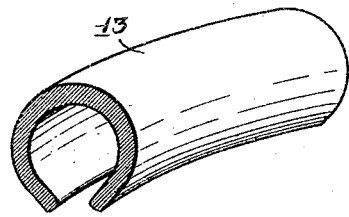
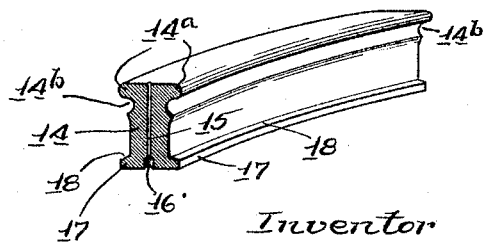
Inventor
Oscar E. Swanson
By Bradbury & Caswell
Attorneys Patented Mar. 23, 1926.

1,577,881

UNITED STATES PATENT OFFICE.

OSCAR E. SWANSON, OF MINNEAPOLIS, MINNESOTA, ASSIGNOR OF ONE-HALF TO FLOYD G. BEAN, OF MINNEAPOLIS, MINNESOTA.

MOLD FOR CURING TIRE CASINGS.

Application filed March 27, 1922. Serial No. 547,209.

*To all whom it may concern:*

Be it known that I, OSCAR E. SWANSON, a citizen of the United States, residing in Minneapolis, in the county of Hennepin and State of Minnesota, have invented a new and useful Mold for Curing Tire Casings, of which the following is a specification.

My invention relates to improvements in molds for curing tire casings.

The curing of tire casings is commonly carried out with the use of companion molds forming an annular casing receiving cavity and an internal channel communicating with the cavity, said cavity being designed to receive a casing and the channel designed to receive the internal flange on the building mold, which mold, during the curing process, serves as an internal supporting medium for the casing. Such molds have been produced and are used in large numbers throughout the country. Another method of curing tire casings is carried out with different mold equipment, a fluid filled bag serving as the internal supporting medium for the casing. These bags are expensive and, at best, are short lived, the inspection and repair thereof representing an appreciable proportion of production cost.

An object of my invention is to supply a new means whereby ordinary mold equipment may be used in the curing of tire casings supported from within by fluid pressure.

In furtherance of the above, it is my object to minimize tire production cost by eliminating the usual curing bags.

With the foregoing and other objects in view, which will appear in the following description, the invention resides in the novel combination and arrangement of parts and in the details of construction hereinafter described and claimed.

In the accompanying drawing, Fig. 1, is a perspective view of a mold embodying my invention; Fig. 2 is a sectional view taken therethrough; Fig. 3 is a similar view showing a "clincher" mold as distinguished from the "straight side" mold shown in Fig. 2; Fig. 4 is a fragmentary perspective view of the bunting pad and Fig. 5 is a similar view of the sealing ring.

In the drawing, 10 designates mold members of usual design forming an annular casing receiving cavity 11 and an internal channel 12 communicating with said cavity. An endless bunting pad 13, preferably of semicured rubber, is provided, the width of said pad being substantially equal to the inner transverse dimension of a corresponding tire casing. A sealing ring 14 is also supplied. This ring, contained, largely, within the channel 12, has its rim arranged to reach within the casing chamber, said rim having pad gripping shoulders $14^a$ inclined outward in near approximation to the contour of the inner margins of the beads of the casing. These shoulders $14^a$ have opposed annular recesses $14^b$ to receive material displaced in the margins of the pad 13 by the outer extremities of the shoulders $14^a$, said recesses forming locks for the margins of said pad (Figs. 2 and 3). A fluid passageway 15 in the ring 14, enlarged at its inner end and threaded, as at 16, to receive the usual fluid conduit, provides for the admission of fluid to the composite internal fluid container formed by the pad 13 and ring 14. Opposed shoulders 17, beveled as at 18 are formed on the sides of the ring 14 (Fig. 2).

In use, the pad 13 is placed within a casing as shown in Figs. 2 and 3. The sealing ring 14 is then applied to the casing. Following this, the casing with the accompanying pad and ring is applied to one of the the mold members 10, whereupon the second mold member is placed upon the first member. The beveled shoulder 17 on one side of the ring aids in the application of said ring to the first mold member and the shoulder 17 on the other side of the ring aids in applying the second mold member. The mold members 10 are clamped together and subjected to heat in the manner common in vulcanizing. In bringing the mold members together, the beads of the casing are pressed against the outer margins of the pad 13 and the inner margins thereof are pressed against the shoulders $14^a$ of the ring 14. Under this pressure, the outer extremities of said shoulders $14^a$ are embedded in the inner margins of the pad, the displaced material in said margin being forced into the recesses $14^b$ and supplying pressure proof connections between the pad 13 and ring 14. Fluid, under pressure, admitted through the passage-way 15 fills the container formed by the ring 14 and pad 13 and expands the latter against the inner wall of the casing.

Changes in the specific form of my invention, as herein disclosed, may be made within the scope of what is claimed without departing from the spirit of my invention.

Having described my invention, what I claim as new and desire to protect by Letters Patent is:

1. In combination, companion mold members forming an annular casing receiving cavity, a composite fluid container comprising an internal annular support for a casing in said cavity, said container consisting of an annular lining pad of resilient material adapted to be confined wholly within the casing and a ring for bridging the space between the edges of said pad, said ring being adapted to back the edge portions of the pad against the inside of the tire and to press into the material at the inner margins of said portions to seal said container, pressure tight, upon the assembling of said mold members.

2. In combination, companion mold members forming an annular casing receiving cavity and an internal, annular channel communicating with said cavity, a resilient pad forming a lining for a casing within the cavity, and a ring having opposed outwardly flaring shoulders on the rim thereof, said ring being removably applicable to said channel and also formed with opposed shoulders at its sides, the shoulders on the rim of the ring being adapted to press into the inner margins of said resilient pad and seal the space therebetween, and the shoulders on the sides of the ring co-acting with the mold members and serving to position said rim in sealing relation.

3. In combination, a pair of companion mold members forming an annular casing receiving cavity and an internal, annular channel communicating with said cavity, a resilient pad forming a lining for a casing within the cavity, and a ring having opposed outwardly flaring shoulders on the rim thereof, each shoulder being formed with an annular recess therein, said ring being removably applicable to said channel and also formed with opposed beveled shoulders at its sides, the shoulders on the rim of the ring being adapted to press into the inner margins of the pad and said recesses being adapted to receive material in said pad displaced by said shoulders to seal the space between said margins of said pad the shoulders on the sides of the ring co-acting with the mold members and serving to position said rim in sealing relation, said shoulders serving further to aid in the application of the ring to one mold member and the application of the second mold member to the first member.

4. The method of inflating a tire casing within a mold during the curing thereof, consisting in lining the casing with an annular pad confined wholly within the same, bringing an annular sealing element to bear against the inside of the pad to grip the edge portions thereof between the inside wall of the casing and said sealing element, and admitting fluid, under pressure, to the pressure tight container formed by said pad and sealing element.

In testimony whereof, I have signed my name to this specification.

OSCAR E. SWANSON.